Oct. 11, 1966 J. U. WHITE 3,277,773
OPTICAL APPARATUS FOR MEASURING THE REFLECTIVE
AND EMISSIVE CHARACTERISTICS OF A SAMPLE
Filed Jan. 14, 1963 8 Sheets-Sheet 1

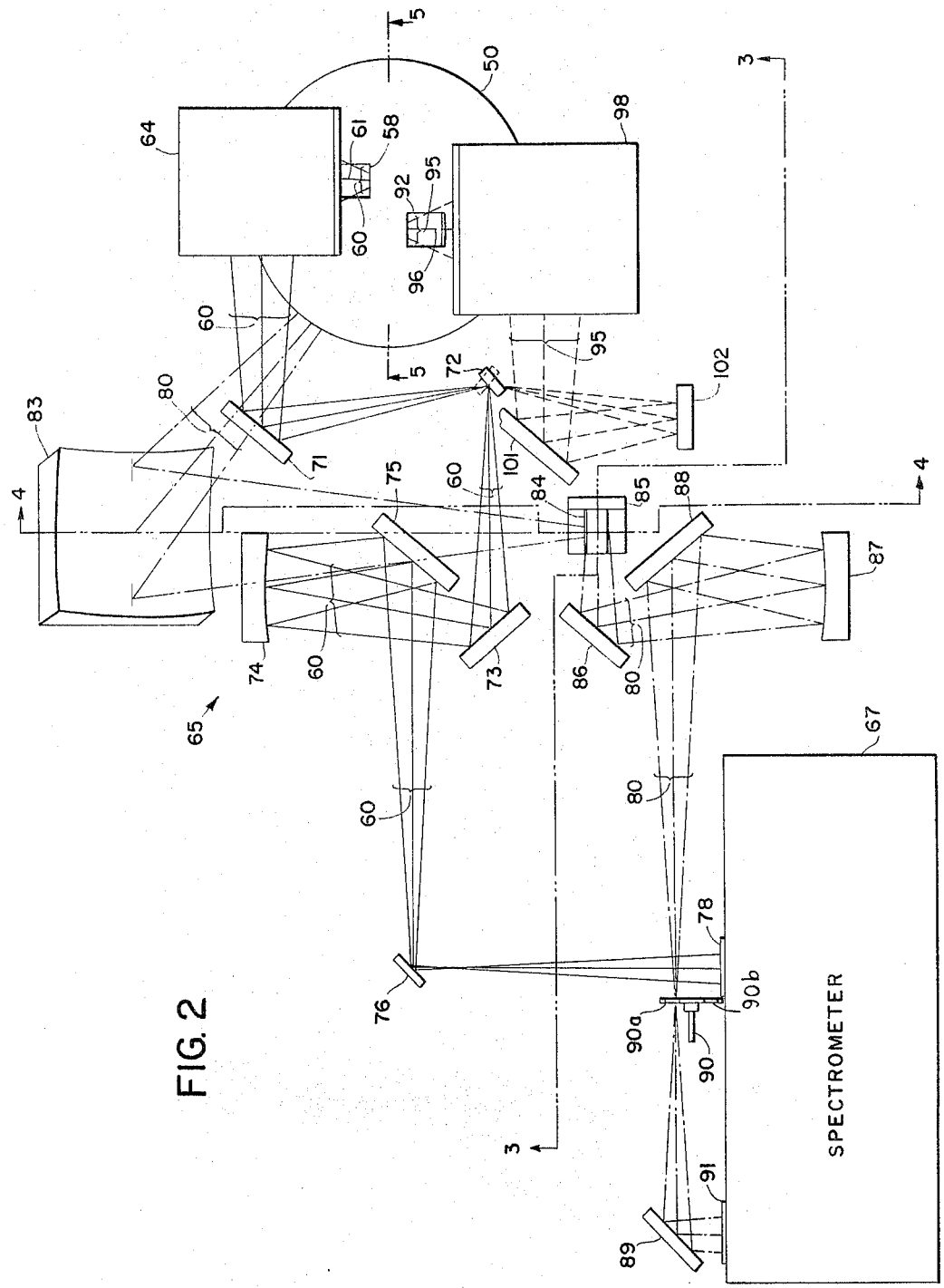

United States Patent Office 3,277,773
Patented Oct. 11, 1966

3,277,773
OPTICAL APPARATUS FOR MEASURING THE REFLECTIVE AND EMISSIVE CHARACTERISTICS OF A SAMPLE
John U. White, 80 Lincoln Ave., Darien, Conn.
Filed Jan. 14, 1963, Ser. No. 251,422
28 Claims. (Cl. 88—14)

This invention relates to radiation measuring apparatus and more particularly to such apparatus for measuring radiant energy reflected from a sample.

Radiation measuring apparatus of the type to which the present invention is directed, while of general application, is particularly well suited for measuring spectral reflectivity. As is well known, a surface of material which is uniformly illuminated from a source of light or other electromagnetic radiation reflects only a portion of the illuminating flux. (As used herein, the term "light" is not restricted to visible light, but may include infrared, ultraviolet or other radiation having wavelengths longer or shorter than the visible spectrum.) Reflectivity is customarily defined as the ratio between the reflected flux and the incident flux, while spectral reflectivity is the reflectivity at a particular wavelength.

Heretofore, various types of apparatus have been employed in the measurement of radiant energy reflected from a sample. For example, in one such apparatus, there is provided an integrating sphere having a reflecting surface of magnesium oxide or other diffusely white material. The sample and a standard or reference are located within the sphere, and a detection device is positioned at a point on the inner sphere surface. Monochromatic radiation from an external source is sequentially reflected first by the sample and then by the standard. The reflected radiation is directed by the sphere to the detector, and the detector readings are compared to ascertain the reflectivity.

The prior apparatus of the integrating sphere type have exhibited certain disadvantages, and these disadvantages have been of special moment in the measurement of reflected energy in the infrared portion of the spectrum. For example, primarily because of the comparatively poor reflective properties of the magnesium oxide coating, a substantial portion of the reflected radiation is absorbed by the sphere and is not detected. As a result, excessive energy losses occur which reduce the overall sensitivity of the apparatus. For measurements of visible light, these deficiencies can be corrected, to some extent, through the use of photo-multipliers or other light sensitive devices. However, particularly in the infrared region, such devices are ineffective, and the energy losses of the apparatus often are of sufficient magnitude to reduce its accuracy beyond acceptable limits.

More recently, attempts have been made heretofore to overcome some of the disadvantages of the integrating sphere through the use of a hohlraum or other heated cavity. The sample is positioned within the hohlraum, and the reflected radiation is directed by a suitable transfer optics system to a spectrometer or other instrument for measuring the radiant flux at selected wavelengths. To provide a standard for ascertaining the reflectivity, the optics system often is adjustable to also detect radiation from the wall of the cavity. This latter radiation, which is representative of the incident flux, similarly is applied to the spectrometer and is compared with the reflected radiation to ascertain the reflectivity.

Among the difficulties experienced in the use of prior apparatus of the type employing a hohlraum, some of the most serious result from the heating of the sample by the hohlraum itself. In the measurement of reflectivity, it is of course important to distinguish between the sample's reflection and its emission. In the hohlraum, however, the varying sample temperatures cause corresponding variations in sample emission, and hence variations in the detected radiation, with the result that the accuracy of the measurements is impaired.

One general object of this invention, therefore, is to provide a new and improved apparatus for measuring radiant energy reflected from a sample.

Another general object of the invention is to provide an apparatus of the character indicated for measuring reflectivity.

More specifically, it is an object of this invention to provide such apparatus wherein the effect of radiation emitted by the sample on the reflectivity measurements is maintained at a minimum.

Another object of the invention is to provide a radiation measuring apparatus of increased accuracy and sensitivity.

A further object of the invention is to provide such apparatus, particularly for use in the infrared region, in which the effect of energy from the source on the temperature of the sample is substantially reduced.

A still further object of the invention is to provide a radiation measuring apparatus of the foregoing type wherein the radiation emitted by the sample may be determined separately and used as a measure of the sample temperature.

Still another object of the invention is to provide an improved apparatus for measuring radiant energy which is economical to manufacture and thoroughly reliable in operation.

In one illustrative embodiment of the invention, the sample and a source of radiant energy are positioned in spaced-apart relationship with each other within a concave reflector, such as a hemispherical or elliptical mirror, for example, in a manner such that the sample is located at the conjugate focus of the location of the source. The atmosphere surrounding the sample is at a cool and uniform temperature. Radiation from the source is directed by the reflector to the sample and is diffusely reflected thereby. A beam of the reflected radiation is directed by a transfer optics system toward a spectrometer or other suitable detection instrument. The transfer optics system also is arranged to receive a second or reference beam of radiation directly from the source and to apply it to the spectrometer. The reflected radiation is compared with the direct, or incident, radiation to ascertain the reflectivity of the sample. From these measurements, the emissivity and other characteristics of the sample may be readily calculated.

In accordance with one feature of the invention, in certain advantageous embodiments, the radiant energy from the source is intermittently interrupted prior to the time it reaches the sample. With this arrangement, the radiation emitted by the sample is readily distinguished from the reflected radiation, and the effect of the emitted radiation is eliminated from the reflectivity measurement.

In accordance with another feature of the invention, in certain good arrangements, the spectrometer is provided with a pair of input channels, and the reference beam is received by one of these channels at the same time the reflected beam is received by the other channel, thus enabling the simultaneous comparison of the two beams to ascertain the reflectivity.

In accordance with still another feature of the invention, in some embodiments, the reference beam is calibrated through the use of a third beam in a manner such that the overall accuracy of the reflectivity measurements is further improved.

In accordance with a further feature of certain preferred embodiments of the invention, the radiation detecting means is located at a position remote from both the sample and the concave surface of the reflector. As a result, the radiant energy reaching the detector, while of an intensity sufficient to provide extremely accurate measurements, exhibits no adverse affect on the detecting means irrespective of the sample temperature.

The present invention, as well as further objects and features thereof, will be understood more clearly and fully from the following description of certain preferred embodiments, when read with reference to the accompanying drawings, in which:

FIGURE 2 is a partially schematic plan view of a measuring apparatus in accordance with another illustrative embodiment of the invention;

Figure 1:
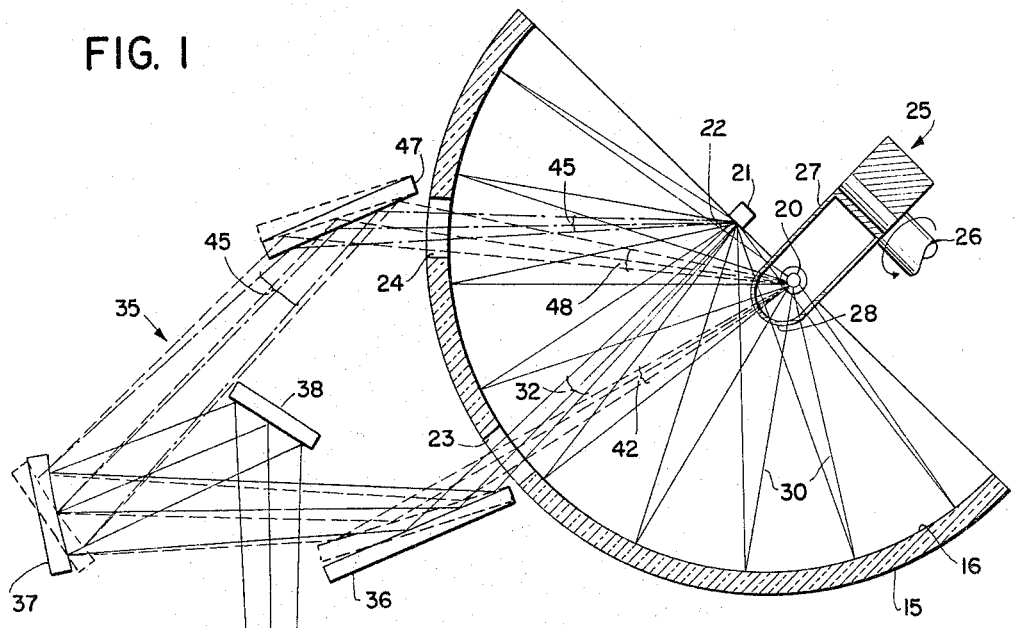
FIGURE 1 is a simplified schematic plan view, partly in section, of an apparatus for measuring the reflectivity of a sample in accordance with one illustrative embodiment of the invention.

Referring to FIGURE 1 of the drawings, there is shown an instrument for measuring the reflectivity of a sample which includes a hemispherical mirror 15 or other reflector having a comparatively deep concave reflecting surface. The mirror 15 is fabricated from suitable optical glass and includes a reflective coating 16 on the polished inner surface thereof. This coating preferably is of an evaporated aluminized material or other material having comparatively high reflective properties.

Positioned within the hemispherical mirror 15 is a source of light 20 and a sample of material 21. The sample 21 includes a flat reflecting surface 22 the reflectivity of which is to be measured. The center of the source 20 and the surface 22 of the sample are positioned in the plane of the base of the mirror 15 and are equally spaced from the center of curvature. With this arrangement, the surface 22 is located with respect to the mirror at the conjugate focus of the location of the source.

A pair of openings or windows 23 and 24 are provided in the hemispherical surface of the mirror 15. These windows are each of comparatively small size with respect to the total area of the mirror surface. The center of the window 23 is located along a line which is normal to the reflecting surface 22 of the sample 21, while the center of the window 24 is oriented along a line which meets the surface 22 at a forty-five degree angle.

A rotary chopper 25 is disposed adjacent the light source 20 and is adapted to intermittently interrupt the light therefrom. The chopper 25 includes a continuously rotating shaft 26 which is externally positioned with respect to the mirror 15 and extends in a direction parallel to an imaginary line interconnecting the source 20 and the sample 21. A semi-circular disc 27 is supported on the shaft 26, and in the position shown in FIGURE 1 this disc extends between the source and the sample. The periphery 28 of the disc 27 is formed so that it curves around the source in a manner such that, in the position shown, the radiation therefrom is prevented from reaching either the mirror 15 or the sample. As the shaft 26 rotates, the disc 27 interrupts the light from the source once during each revolution, for purposes that will become more fully apparent hereafter.

The chopped light from the source 20 is reflected by the inner surface of the hemispherical mirror 15 and is focused on the reflecting surface 22 of the sample 21. In FIGURE 1, the light from the source is shown schematically at 30. The light striking the surface 22 is reflected thereby in all directions. A narrow beam 32 of this reflected light passes through the window 23 in the mirror 15 and is received by a transfer optics system indicated generally at 35. The system 35 includes a flat mirror 36 which receives the beam 32, and, in the position shown by full lines in FIGURE 1, is oriented such that the angle of incidence of the beam is sixty-seven and one-half degrees. In this position, the mirror 36 reflects the beam toward a mirror 37 having a concave reflecting surface. In the full line position of this latter mirror, the angle of incidence of the beam is eleven degrees, fifteen minutes. The beam is reflected thereby toward a second flat mirror 38, which it meets at an angle of incidence of thirty-three degrees, forty-five minutes. From the mirror 38, the beam is directed through a window 39 of a spectrometer 40 and is focused at a monochromator entrance slit formed by a pair of jaws 41. The spectrometer 40 is of conventional construction and, in addition to the monochromator, includes the usual A.C. detection system (not visible in FIGURE 1) for ascertaining the intensity of a selected, almost monochromatic portion of the light reflected from the sample.

To ascertain the amount of light incident on the sample 21, the flat mirror 36 is moved from its full line position to its dotted line position. In the new position, a calibration beam 42 of light is received by the mirror 36 directly from the source 20 through the window 23. The beam 42 is reflected by the mirror 36 toward the mirror 37 and is directed thereby to the mirror 38. The beam is reflected by this latter mirror toward the window 39 of the spectrometer 40 and is focused at the entrance slit formed by the jaws 41. The spectrometer detects and measures a monochromatic portion of the calibration beam, and the resulting measurement provides a reference which is compared with the corresponding measurement from the sample beam 32 to determine the reflectivity of the sample.

The hemispherical mirror 15 focuses the light from the source 20 on the surface 22 of the sample 21, which is positioned at the real image of the source. The relative positions of these components is such that the sample surface is illuminated substantially from all directions. This illumination is of high and uniform intensity. The size of the windows 23 and 24 is small when compared to the reflecting surface of the mirror 15, with the result that any energy loss therethrough is maintained at a minimum and below that which would adversely affect the accuracy of the measurements.

The atmosphere within the mirror 15 is at substantially room temperature. In addition, the chopper 25 is effective to reduce by fifty percent the amount of radiation from the source 20 which reaches the sample 21. With this arrangement, the heating of the sample by the source is substantially reduced.

By chopping the radiation from the source prior to the time it reaches the sample, the reflected radiation from the sample likewise is chopped, while the emission therefrom is uninterrupted. The sample beam 32 thus includes a reflection component which varies at the chopping frequency and a substantially constant emission component. The reflection component is detected by the A.C. detection system in the spectrometer 40, as is the calibration beam 42. However, the emission component is ignored by the detection system with the result that the reflectivity measurements are substantially independent of the radiation emitted from the sample.

As indicated heretofore, the center of the window 23 is disposed along a line which is normal to the reflecting surface 22 of the sample. The specular portion of the total reflected radiation passes through the window and is not detected. The diffusely reflected radiation, on the other hand, is received by the spectrometer 40 and is compared with the calibration beam 42 to provide an extremely accurate measurement of the diffuse reflectivity of the sample.

In cases in which total reflectivity is to be measured, the spherical mirror 37 in the optics system 35 is moved from its full line position to its dotted line position. In this latter position, the mirror 37 receives a sample beam 45 of light from a flat mirror 47 which is located adjacent the window 24. In a manner similar to the sample beam 32 described heretofore, the beam 45 is received from the sample 21 from the direction of the hemispherical mirror 15 and subtends a comparatively small solid angle with respect thereto. The beam 45 is reflected from the sample surface 22 at a forty-five degree angle and includes both specular and diffuse reflection. The beam meets the mirror 47 at an angle of incidence of sixty-seven and one-half degrees and is directed by the mirrors 47 and 37 toward the flat mirror 38. The angle of incidence of the light at the mirror 37 is eleven degrees, fifteen minutes. The mirrors 37 and 38 again bring the beam to a focus at the entrance slit jaws 41 of the monochromator in the spectrometer 40, where essentially monochromatic radiation is isolated from the beam and is detected to provide a measurement of the total reflection from the sample at the selected wavelength.

Upon the movement of the mirror 47 from its full line position to its dotted line position, the mirror looks at the source 20 and receives a calibration beam 48 therefrom which is representative of the light incident on the sample 21. The beam 48 is reflected by the mirror 47 toward the mirror 37 and is directed thereby to the mirror 38. The mirror 38 reflects the beam toward the monochromator entrance slit jaws 41 in the spectrometer 40, where a substantially monochromatic portion of the beam is detected and measured. The measurement is compared with the previously ascertained reflection from the sample beam 45 to ascertain the total reflectivity of the sample.

Figure 3:
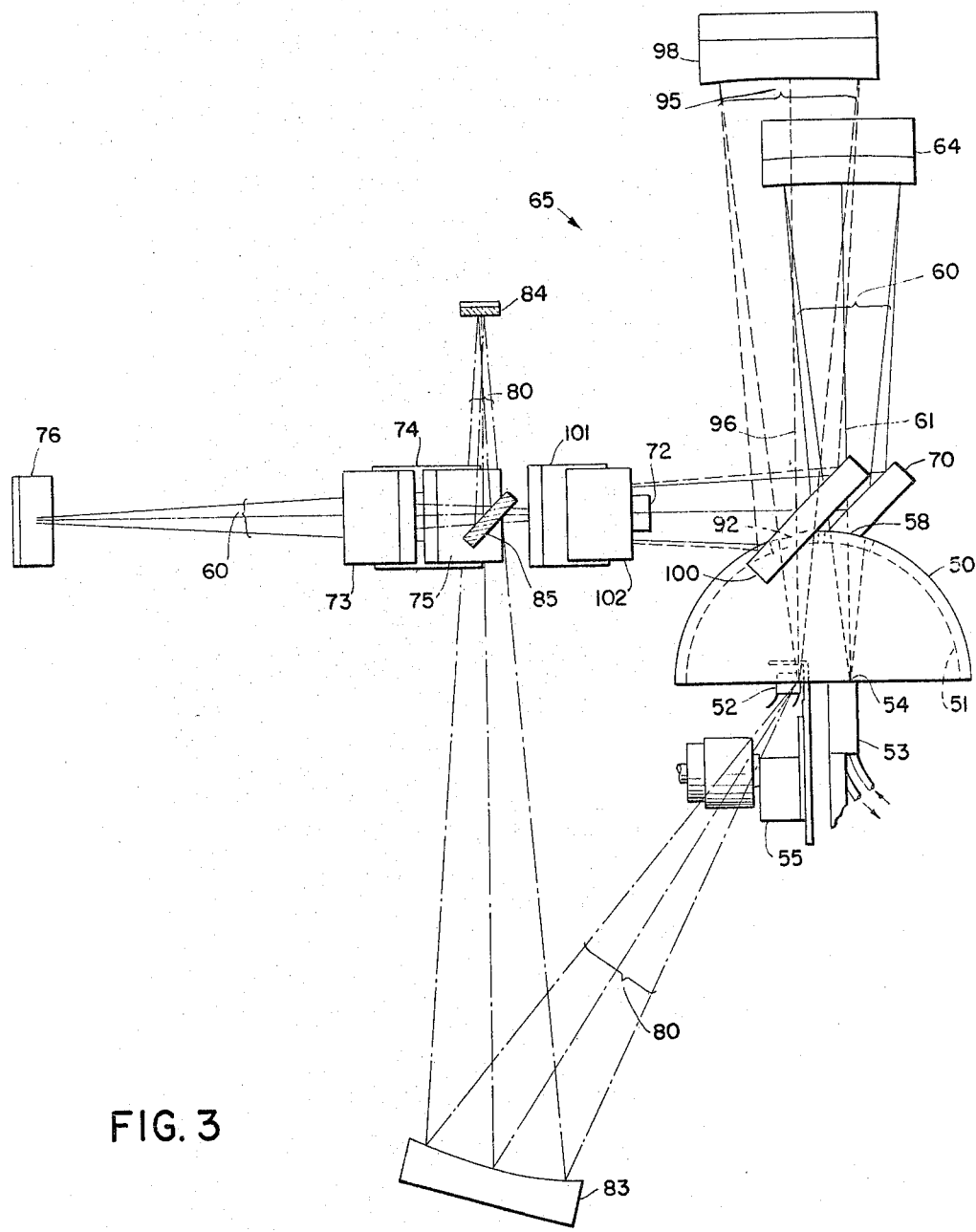
FIGURE 3 is a partially schematic view of the apparatus of FIGURE 2, with certain parts shown in section, as seen generally along the line 3—3 in FIGURE 2.
Figure 4:
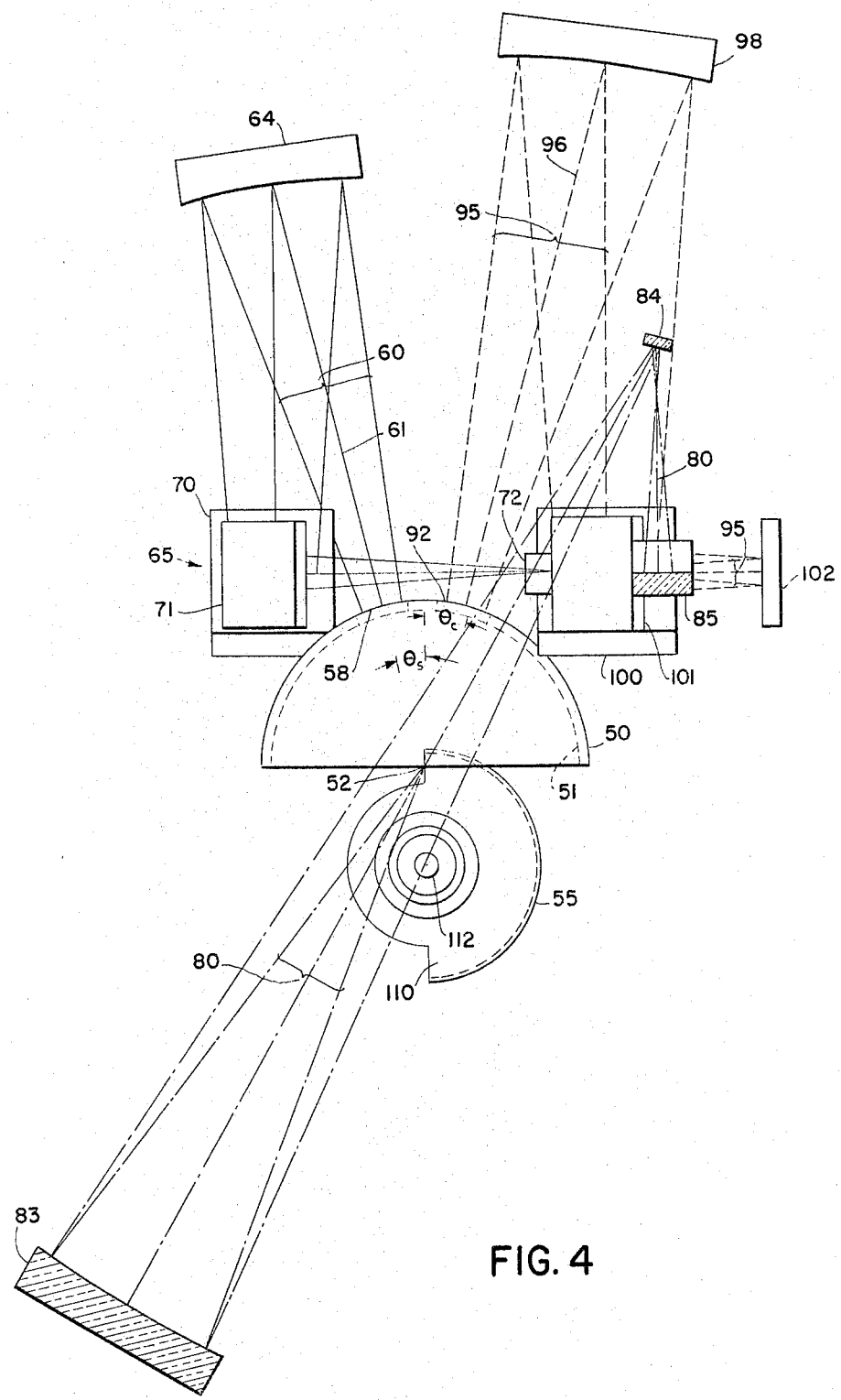
FIGURE 4 is a partially schematic view of the apparatus of FIGURE 2, with certain parts shown in section, as seen generally along the line 4—4 in FIGURE 2.
Figure 5:
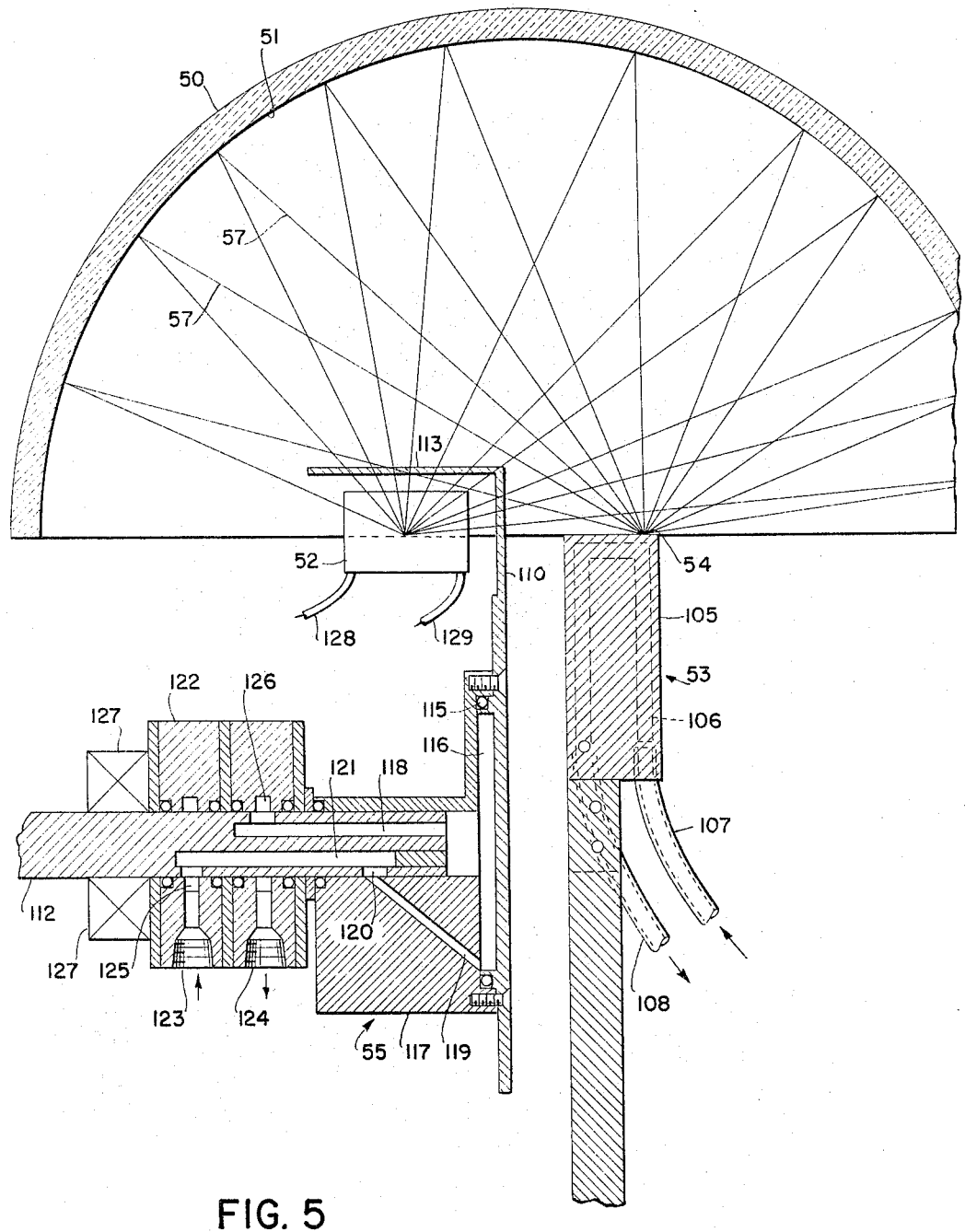
FIGURE 5 is an enlarged detailed sectional view taken generally along the line 5—5 in FIGURE 2, with certain parts omitted for purposes of clarity.

In the embodiment illustrated in FIGURE 1, the sample beam and the calibration beam are detected in sequence and are then compared to determine the reflectivity. In other good arrangements, the beams are detected and compared simultaneously. One such arrangement is shown in FIGURES 2–5 and includes a hemispherical mirror 50 having a concave reflecting surface 51. As best shown in FIGURES 3 and 5, the mirror 50 is positioned over a source 52 and a sample 53 the reflectivity of which is to be measured. The sample 53 includes a horizontal reflecting surface 54 which is disposed in the plane of the mirror 50, as is the center of the source 52. The sample and the source are equally spaced from the mirror's center of curvature, and the sample surface 54 is thus located with respect to the mirror at the conjugate focus of the location of the source.

The light from the source 52 is chopped by a rotary chopper 55 and is then reflected by the concave surface 51 of the hemispherical mirror 50, as shown schematically at 57 (FIGURE 5). The reflected light is focused on the surface 54 of the sample 53 and is reflected thereby in all directions. A portion of the light reflected from the sample passes through a small opening or window 58 (FIGURES 2–4) in the mirror 50 in the form of a narrow beam 60. The orientation of the window 58 is such that the central or principal ray 61 of the sample beam 60 is perpendicular to an imaginary line interconnecting the centers of the sample surface 54 and the source but meets a line normal to the sample surface at a small angle $\theta_s$ (FIGURE 4) which illustratively is of the order of fifteen degrees. With this arrangement, the sample beam includes both specular and diffuse components.

After passing through the window 58, the sample beam 60 is received by a concave mirror 64 in a transfer optical system indicated generally at 65. The system includes a series of flat and concave mirrors which serve to increase the size of the sample image and apply it to a spectrometer 67. Thus, the sample beam 60 is reflected by the mirror 64 toward a flat mirror 70 and is then directed, as best shown in FIGURE 2, to a flat mirror 71, a rotatable flat mirror 72, a flat mirror 73, a concave mirror 74, a flat mirror 75 and a flat mirror 76. This latter mirror reflects the beam 60 toward a window 78 in the spectrometer.

Simultaneously with the application of the sample beam 60 to the spectrometer 67, a reference beam 80 is applied thereto from the source 52. As best shown in FIGURES 3 and 4, the reference beam is taken from the back side of the source, that is, the side opposite the side exposed to the reflecting surface 51 of the hemispherical mirror 50. The arrangement is such that the reference beam is not chopped by the chopper 55, for purposes that will become more fully apparent hereafter.

The reference beam 80 is received by a concave mirror 83 in the transfer optical system 65 and is reflected thereby to a flat mirror 84, a flat mirror 85, a flat mirror 86, a concave mirror 87, a flat mirror 88 and a flat mirror 89. As the beam 80 passes from the mirror 88 to the mirror 89, it is focused at a rotary chopper 90 which periodically interrupts the beam at a frequency different from the chopping frequency of the sample beam chopper 55. The chopper 90 is continuously rotated at the same speed as the chopper 55 but includes two blades 90a and 90b so that the beam is interrupted twice during each revolution. The frequency $f_1$ of the interruptions of the reference beam 80 is thus twice the frequency $f_2$ of the interruptions of the sample beam 60. The mirror 89 directs the chopped beam 80 toward a window 91 in the spectrometer 67.

The spectrometer 67 is of the double-beam type and includes two input channels, one for the sample beam 60 and one for the reference beam 80. As will be understood, selected, monochromatic portions of these beams are applied to a detection and measuring system (not visible in FIGURE 2–5) which ascertains their intensities. The intensities are compared to determine the total reflectivity of the sample at the selected wavelength.

One particularly advantageous double-beam spectrometer which is useful in connection with the invention is referred to commercially as the "Cary-White Model 90 Infrared Spectrophotometer," manufactured by the Applied Physics Corporation, Monrovia, California. The model 90 combines the incoming beams, and the resulting composite beam is applied to two monochromators which are of the type described in patent 3,048,080 granted August 7, 1962 to John U. White. The monochromatic radiation from these monochromators is supplied to a frequency selective, A.C. detection system which separates the composite signal into components representative of the intensities of the two beams. The intensity components are transmitted to a strip chart recorder which automatically records the ratio therebetween.

In using the model 90 spectrometer with the apparatus of FIGURES 2–5, the incoming sample and reference beams 60 and 80 bypass the choppers customarily provided therein. As indicated heretofore, the rotary chopper 90 produces a periodic modulation in the reference beam 80 at the frequency $f_1$, which illustratively is twice the chopping frequency $f_2$ of the sample beam chopper 55. Upon entering the model 90 spectrometer and being combined with the sample beam 60, the chopped reference beam passes through the monochromators and is detected by the frequency selective detection system. The resulting signal is accurately proportional to the intensity of the light incident on the sample.

The rotary chopper 55 produces a periodic modulation in the reflected component of the sample beam 60 at the frequency $f_2$. In the model 90 spectrometer, a monochromatic portion of the combined sample and reference beams is selected by the monochromators and is then applied to the detection system. The detection system ascertains, from the monochromatic composite signal received from the monochromators, the portion of the sample signal which is at this chopping frequency. However, the comparatively constant portion of the sample signal, which is representative of the emission of the sample, is ignored by the detection system in a manner similar to that described heretofore. The detected sample signal thus corresponds to the reflected radiation from the sample but is independent of sample emission. This signal is compared with the corresponding signal derived from the reference beam to ascertain the sample's reflectivity.

In cases in which it is advantageous or desirable to further improve the accuracy of the reflectivity measurements, the reference beam 80 is calibrated prior to the measurement of the sample's reflectivity. The intensity of the light from the source 52 which reaches the sample 53, that is, the light from the front side of the source (the side illuminating the sample), occasionally may vary slightly with respect to the intensity of the light in the reference beam derived from the back side of the source. As an illustration, a portion of the light reflected from the sample is directed back to the front side of the source, thus heating this side to a temperature in excess of the temperature at the back side of the source. To enable the calibration of the reference beam so that it is representative of the light from the same side of the source as that illuminating the sample, the hemispherical mirror 50 is provided with an opening or window 92 which receives a chopped calibration beam 95 from the front side of the source. The orientation of the window 92 is such that the principal ray 96 of the calibration beam is perpendicular to an imaginary line between the centers of the sample surface 54 and the source 52 but meets the line normal to the sample surface at a small angle $\theta_c$ (FIGURE 4). This angle is equal to the angle $\theta_s$ for the window 58 but is measured in the opposite direction, so that the windows 58 and 92 are disposed on opposite sides of a vertical plane including the line between the sample surface and the source.

To calibrate the reference beam 80, the mirror 72 in the transfer optics system 65 is rotated eighty degrees from its full line position to its dotted line position (FIGURE 2). The calibration beam 95 is received from the source 52 by a concave mirror 98 and is reflected thereby to a mirror 100 (FIGURE 3), a mirror 101, a mirror 102 and the mirror 72. From the mirror 72, the calibration beam follows the path of the sample beam 60 to the mirror 73, the mirror 74, the mirror 75, the mirror 76 and the sample window 78 of the spectrometer 67. A signal representative of the intensity of a monochromatic portion of the calibration beam is detected by the spectrometer detection system and is compared with the corresponding signal for the reference beam. The intensity of this latter signal is then adjusted to compensate for any discrepancies which might result from the taking of the reference beam from the back side of the source.

As indicated heretofore, with the reflecting surface 54 of the sample 53 in its horizontal position (the position shown), the sample beam 60 includes both specular and diffuse components. To determine the diffuse reflectivity of the sample, the sample is tipped through an angle equal to the angle $\theta_s$ (FIGURE 4) so that a line normal to the surface 54 passes through the center of the window 58. In addition, the mirror 50 is suitably modified, such as by increasing the solid angle subtended by the mirror surface 51, for example, so that the mirror illuminates the surface 54 from all directions in the sample's tipped position. In this position, the specularly reflected light from the sample is discharged through the window and is not detected. The diffuse component, on the other hand, is received by the spectrometer 67 and is compared with the reference beam to ascertain the diffuse reflectivity.

In several advantageous embodiments, the temperature of the sample is carefully controlled to provide reflectivity measurements over a wide range of sample temperatures. In these arrangements, the sample material advantageously is coated on one end of an elongated block 105 (FIGURE 5) to form the reflecting surface 54. The block 105 preferably is of copper or other heat conductive material and includes an elongated aperture 106 therein which, in the form shown, is in the shape of an inverted U. One end of the aperture 106 is connected to an inlet conduit 107, while the other end communicates with an outlet conduit 108. Fluid at the desired temperature is continuously circulated through the aperture 106 from the conduit 107 to the conduit 108 to maintain the sample at this temperature throughout the measurement. For measurements at comparatively low temperatures, liquid nitrogen may be used as the circulating fluid. At higher temperatures, oil, water, steam or other fluids may be used with good effect.

To measure the reflectivity of the sample at still higher temperatures, the sample material is coated on a thin platinum ribbon (not shown) which is supplied with suitable current to heat the sample to the desired temperature.

As best shown in FIGURE 5, the source 52 illustratively is in the form of a helical coil which is supplied with current by a pair of conductors 128 and 129. The chopper 55 includes a semicircular disc 110 which is continuously rotated by a shaft 112. A semicylindrical shield 113 surrounds the disc periphery and, in the position shown, effectively prevents the source radiation from reaching the sample. The disc 110 includes an integrally formed ring 115 which protrudes from the surface thereof adjacent the shaft 112. This ring defines an annular recess 116 between the disc and a counterweight 117 which connects the disc to the shaft. The center portion of the recess 116 communicates with an elongated aperture 118 in the adjacent end of the shaft, while the outer portion is in communication with a passage 119 which extends angularly through the counterweight 117 and connects with a recess 120 in the shaft leading to an elongated shaft aperture 121. The elongated apertures 118 and 121 are parallel to each other and to the shaft axis. A stationary member 122 is disposed about the shaft adjacent the inner ends of the apertures 118 and 121 and is provided with an inlet opening 123 and an outlet opening 124. These openings respectively communicate with an annular groove 125 leading to the aperture 121 and an annular groove 126 leading to the aperture 118. The shaft is suitably supported by bearings indicated schematically at 127.

The chopper shaft 112, the counterweight 117, the disc 110 and the shield 113 are continuously rotated to thereby interrupt the light from the source 52 once during each revolution. A supply of water or other coolant is applied to the inlet opening 123 during the rotation of the shaft. The coolant follows a path from the opening 123, the groove 125, the elongated aperture 121, the recess 120, the passage 119, the recess 116, the elongated aperture 118 and the groove 126 to the outlet opening 124. The arrangement is such that the chopper 55 is maintained at a constant temperature by the cooling fluid during the various measurements. As a result, the emission therefrom is at a constant level and does not affect the detected signals.

To insure that radiation emitted by the sample 53 is not reflected back to the sample by the chopper 55 in synchronism with the chopper's rotation, the chopper disc 110 preferably is provided with a black, substantially non-reflecting coating.

Referring now to FIGURES 6-9, there is shown a measuring apparatus in accordance with a further preferred embodiment of the invention. The apparatus includes a hemispherical mirror 130 which in general is similar to the mirrors 15 and 50 described heretofore but includes only one opening or window 132 in the reflecting surface thereof. A source of light 134 and a sample of material 135 are positioned within the mirror 130 in the plane of the mirror base and are equally spaced with respect to the center of curvature. The sample 135 is thus located with respect to the mirror at the conjugate focus of the location of the source 134. The light from the source is chopped by the semicircular disc 136 of a rotary chopper 137 of a type similar to the chopper 55 described above.

Figures 7, 9:
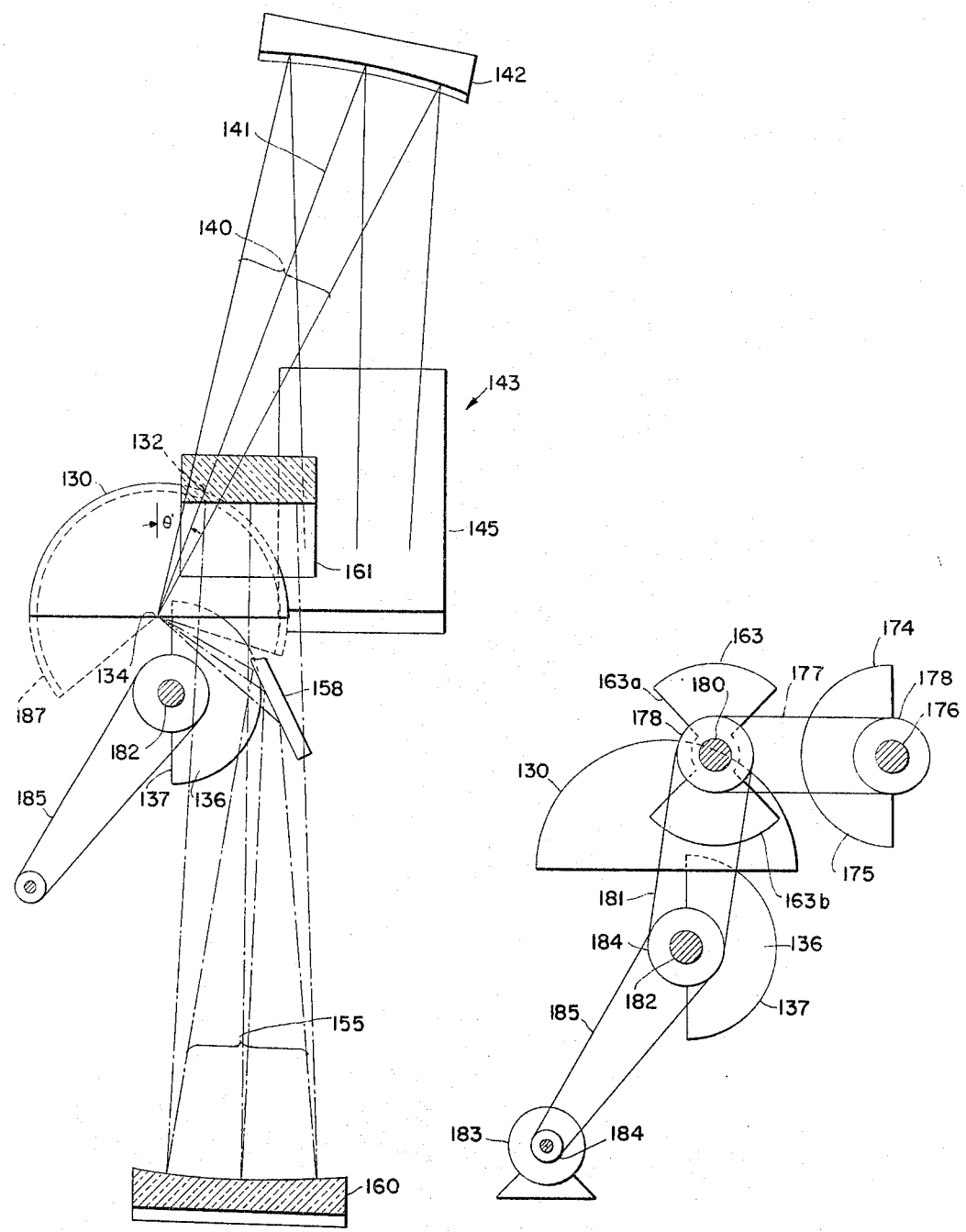
FIGURE 7 is a partially schematic view of the apparatus of FIGURE 6, with certain parts shown in section, as seen generally along the line 7—7 in FIGURE 6.
FIGURE 9 is a partially schematic view of a portion of the apparatus of FIGURE 6, looking in the direction of the arrows 9—9 in FIGURE 6, together with certain additional parts.

Light from the source 134 is reflected by the hemispherical mirror 130 and is focused on the sample 135. The sample reflects this light in all directions. A narrow beam 140 of the reflected light passes through the window 132 and is received by a concave mirror 142 in a transfer optics system 143. In the position shown, the orientation of the window 132 is such that the principal ray 141 of the beam 140 is perpendicular to an imaginary line interconnecting the sample and the source but, as best shown in FIGURE 7, meets a line normal to the sample surface at a small angle $\theta'$ which illustratively is of the order of twenty degrees.

Figure 8:
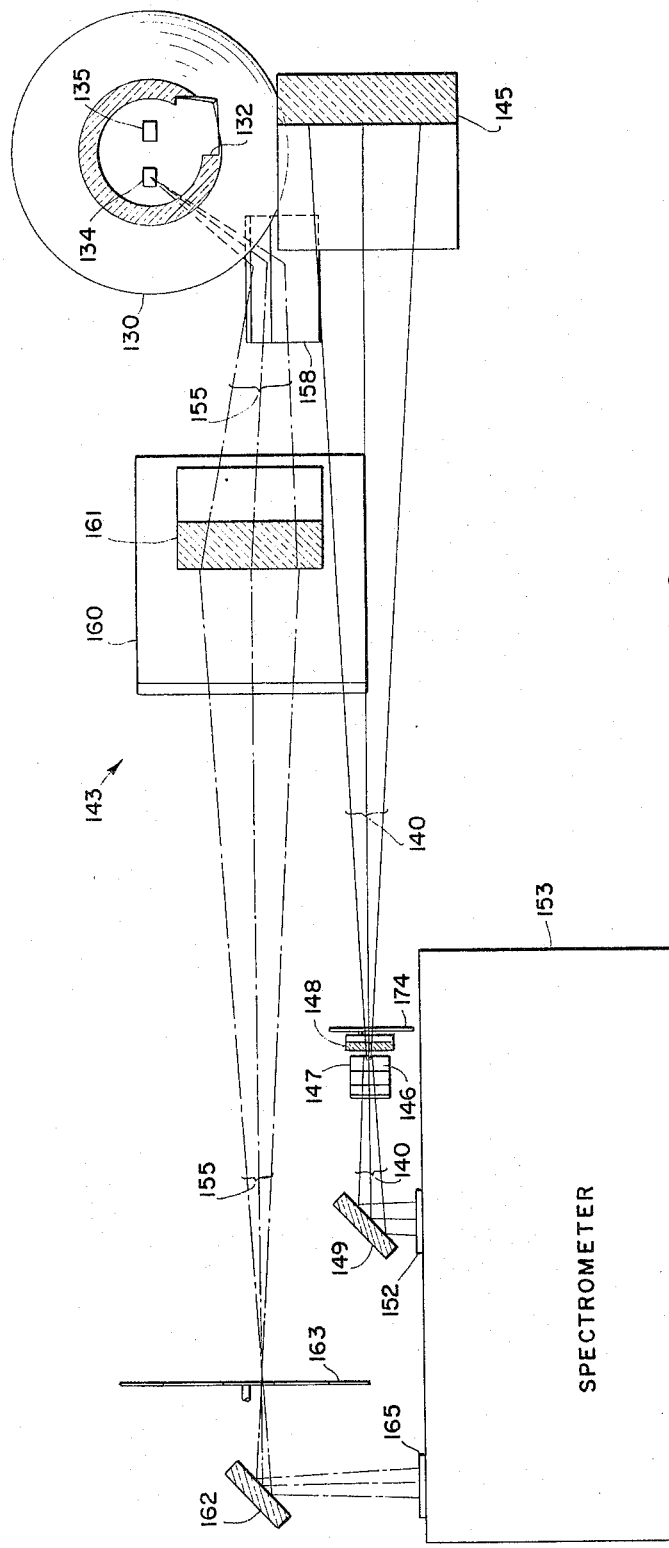
FIGURE 8 is a partially schematic view of the apparatus of FIGURE 6, with certain parts shown in section, as seen generally along the line 8—8 in FIGURE 6.

The sample beam 140 is reflected by the concave mirror 142 to a mirror 145 (FIGURE 6), then to the flat reflecting surface 146 of a two-sided mirror 147, then to a mirror 148 and then to a mirror 149. As best shown in FIGURE 8, the mirror 149 directs the sample beam through a window 152 in a double beam spectrometer 153.

Simultaneously with the application of the sample beam 140 to the spectrometer 153, a reference beam 155 is applied thereto from the source 134. The reference beam is taken from the back side of the source and is not chopped by the sample chopper 137. The beam is received by a mirror 158 in the optics system 143 and is directed thereby to a concave mirror 160, a mirror 161 and then to a mirror 162. Between the mirrors 161 and 162, the beam is chopped by a rotary chopper 163 at a frequency different from that of the sample chopper 137. Thus, as best shown in FIGURE 9, the chopper 163 is provided with two oppositely disposed blades 163a and 163b which rotate at the same speed as the sample chopper 137 and thereby periodically interrupt the reference beam at twice the frequency of the chopper 137. The mirror 162 reflects the thus chopped reference beam toward a window 165 (FIGURE 8) in the spectrometer 153, where it is combined with the sample beam 140. In a manner similar to that described heretofore in connection with the description of FIGURES 2-5, a selected, monochromatic portion of the combined beam is applied to the detector. The detector develops a first signal at the frequency of the sample chopper 137 and a second signal at the frequency of the reference chopper 163. These signals are then compared to ascertain the reflectivity of the sample.

Figure 6:
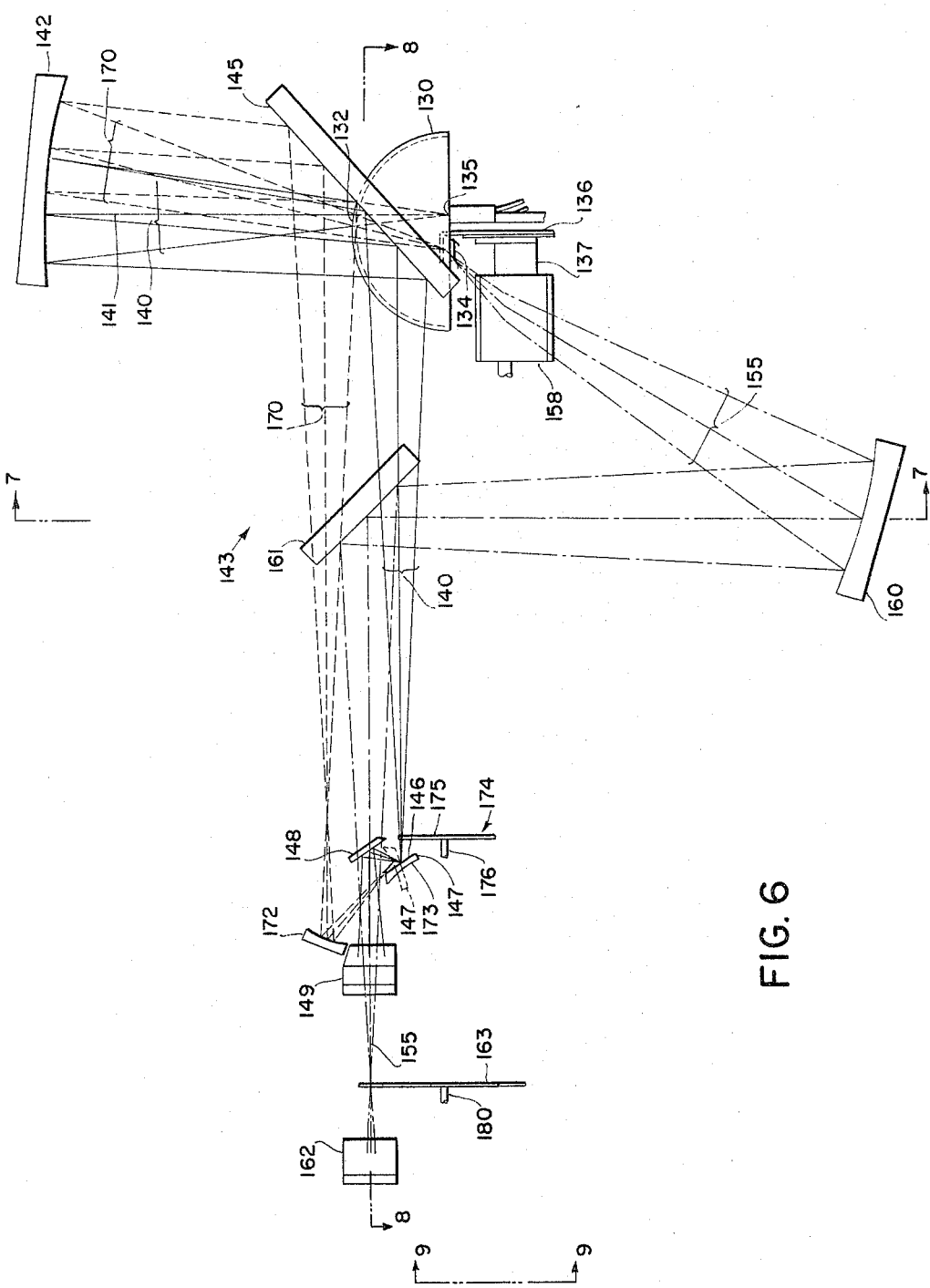
FIGURE 6 is a partially schematic elevational view of a measuring apparatus in accordance with a third illustrative embodiment of the invention.

The reference beam 155 is calibrated by a calibration beam 170 to compensate for any errors in the reference beam which might result from the difference in intensity of the light from the front and back sides of the source 134. The beam 170 is taken from the front side of the source and passes through the window 132, where it is received by the concave mirror 142. This mirror directs the calibration beam to the mirror 145, then to a concave mirror 172 and then to a concave reflecting surface 173 of the two-sided mirror 147, which at this time is in its dotted line position (FIGURE 6). From the surface 173, the beam is directed to the mirror 148, the mirror 149 and the sample window 152 (FIGURE 8) in the spectrometer 153. The spectrometer compares the calibration beam with the reference beam in a manner similar to that described above to enable the adjustment of the reference beam intensity to compensate for any errors resulting from the taking of the reference beam from the back side of the source.

For many reflectivity measurements, as well as for other purposes, it is advantageous to accurately ascertain the temperature of the sample. In the embodiment of FIGURES 6-9, this is accomplished in a rapid and straight-forward manner through the use of a rotary chopper 174. The chopper 174 includes a chopping disc 175 which describes a sector of a circle and is oriented in position to interrupt the sample beam 140 as it passes from the mirror 145 to the mirror 147. In the measurement of the reflected radiation from the sample as described above, the disc 175 is arranged so that it has no affect on the sample beam. To measure sample temperature, however, the chopper 175 is continuously rotated at the same speed as the sample chopper 137 and the two-bladed reference chopper 163. Thus, as best shown in FIGURE 9, the chopper 174 is mounted on a shaft 176 which is connected by a belt 177 and suitable equal diameter pulleys 178 to a shaft 180 for the reference chopper 163. The shaft 180 in turn is connected by a pulley arrangement and a belt 181 to a shaft 182 for the sample chopper 137. This latter shaft is driven by an electric motor 183 through pulleys 184 and a belt 185.

The disc 175 of the chopper 174 is oppositely disposed with respect to the shielded disc 137 of the chopper 137. The shielded disc 136 chops one half of the radiation from the source 134 which is reflected by this sample 135, while the disc 175 chops the other half of the reflected radiation. Thus, radiation reflected from the sample is not included in the beam 140 and does not reach the spectrometer 153. The radiation emitted by the sample, on the other hand, is not affected by the chopper 137 and is chopped only by the chopper 174. With this arrangement, the beam 140 comprises emission from the sample which is chopped at the frequency of the chopper 174 and is measured by the spectrometer against the reference beam 155. As will be understood, for a given sample, the emission is a function of the sample's temperature and emissivity. As a result, the temperature of the sample may be readily calculated, from its measured emission and reflectivity, by comparing the measurements with standard measurements at known temperatures.

In cases in which it is advantageous or desirable to measure only the diffuse reflectivity of the sample, or the total reflectivity at larger angles of observation, the hemispherical mirror 130 is replaced by a hyperhemispherical mirror 187, as shown schematically in FIGURE 7 by dotted lines. For measurements of diffuse reflectivity only, the sample is tipped to face the window 132, so that the specular component of the reflected radiation passes back through the window and is not detected. The diffuse component, on the other hand, is included within the beam 140 and is compared by the spectrometer with the reference beam 155 to ascertain the sample's diffuse reflectivity. For other angles of observation, the sample is tipped to the desired angle.

In the various illustrated embodiments of the invention, the mirrors 15, 50 and 130 include concave surfaces illuminating the sample with radiation from the source which are in the form of hemispheres. These mirrors thus illuminate the sample with radiation from a comparatively large solid angle which is representative of the radiation from a hemispherical solid angle around the sample. In other advantageous arrangements, other forms of mirrors subtending large solid angles from the sample are used with good effect. As an illustration, in some good arrangements, elliptical mirrors are employed in place of the mirrors 15, 50 and 130, in configurations similar to those shown in the drawings, and the sample is located at the conjugate focus of the location of the source. In another good arrangement, an elliptical mirror is used with its major axis perpendicular to the surface of the sample to focus a reduced image of the source on the sample. The source and sample radiation are detected and compared in a manner similar to that described above to measure the sample's reflectivity.

Figure 10:
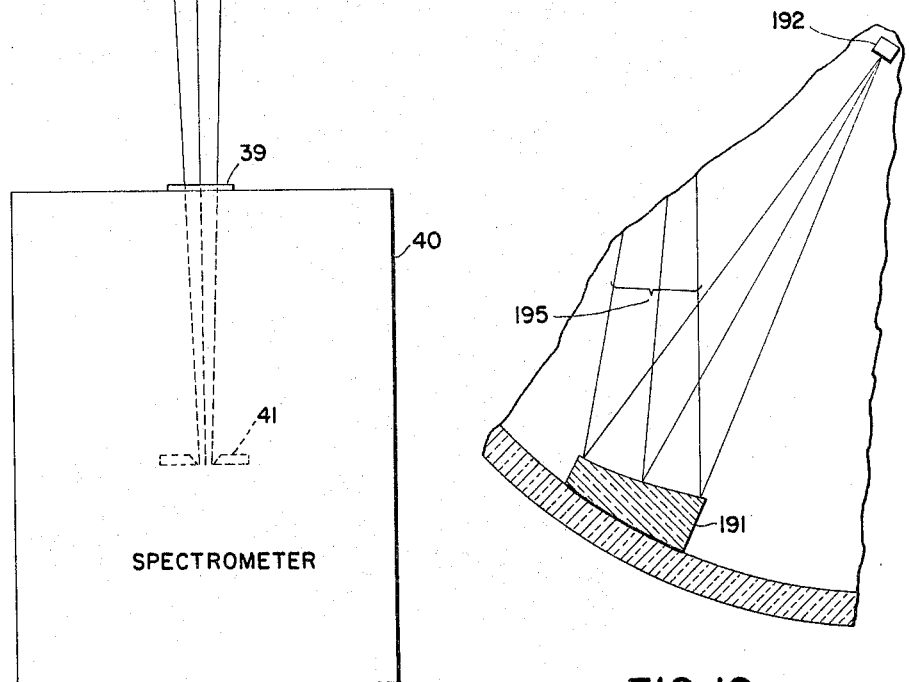
FIGURE 10 is a fragmentary sectional view of a portion of a reflectivity measuring apparatus, showing a device useful in controlling the direction of a beam of energy reflected from the sample.

In place of one or more openings or windows in the surfaces of the mirrors 15, 50 and 130, some embodiments employ other means for viewing the sample, and in some cases the source, from the direction of the mirror. For example, in FIGURE 10 there is shown a portion of a hemispherical mirror 190 having a small curved mirror 191 mounted in close proximity with its inner reflecting surface. The mirror 191 receives the reflected radiation from a sample 192 and directs it out the open or back side of the mirror 190 in the form of a narrow beam 195. The beam 195 is then detected and compared with a reference beam to measure the reflectivity of the sample.

In the chopper systems of the embodiments shown in FIGURES 2 and 6, the sample beams and the calibration beams preferably are chopped at frequencies different from those of the reference beams. As a result, the frequency selective detection systems in the spectrometers readily distinguish between the selected chopping frequencies. In other advantageous embodiments, the beams are chopped at the same frequency and are distinguished by differences in phase between the choppers. Other arrangements for modulating the beams to distinguish therebetween also may be used with good effect.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. In an apparatus for measuring radiation from a sample, in combination, a source of radiant energy, mirror means including a specularly reflective concave surface disposed adjacent said source and said sample, the configuration of said mirror means being such that it has conjugate foci, said sample being located at one of said foci and said source being located at the conjugate focus such that radiation from said source is directed by said surface to said sample from a large solid angle and is reflected thereby, means for receiving a beam of radiation from said sample, said beam including a reflected component and a component emitted by said sample, means for producing a periodic modulation in the reflected component of said beam, and detection means responsive to said beam for deriving therefrom a signal representative of said reflected component and substantially independent of said emitted component.

2. In an apparatus for measuring radiation from a sample, in combination, a source of radiant energy in spaced relationship with said sample, means including a hemispherical mirror disposed about said source and said sample, said sample being located with respect to said mirror at the conjugate focus of the location of said source, whereby radiation from said source is directed by said mirror to said sample from a large solid angle and is reflected thereby, means for receiving a beam of radiation from said sample, said beam including a reflected component and a component emitted by said sample, means for producing a periodic modulation in the reflected component of said beam, and detection means responsive to said beam for deriving therefrom a signal representative of said reflected component and substantially independent of said emitted component.

3. In an apparatus for measuring radiation from a sample, in combination, a source of radiant energy in spaced relationship with said sample, mirror means including a specularly reflective concave surface disposed adjacent said source and said sample for reflecting radiation from said source to said sample, said mirror means having a configuration such that for a given placement of said source radiation from said source is directed to a focus from a solid angle representative of the radiation from a hemispherical solid angle around said sample, said sample being located at said focus, means for receiving a beam of radiation from said sample, said beam including a reflected component and a component emitted by said sample, means for producing a periodic modulation in the reflected component of said beam, and detection means responsive to said beam for deriving therefrom a single representative of said reflected component and substantially independent of said emitted component.

4. In an apparatus for measuring radiation from a sample, in combination, a source of radiant energy in spaced relationship with said sample, mirror means disposed about said source and said sample for reflecting radiation from said source to said sample, said mirror means including a concave reflecting surface subtending a large solid angle with respect to said sample and having a configuration such that for a given placement of said source radiation therefrom is directed to a focus from said solid angle, said sample being located at said focus, means for receiving a beam of radiation from said sample, said beam including a reflected component and a component emitted by said sample, means for periodically interrupting the radiation from said source prior to the time it reaches said sample, to similarly interrupt the reflected component of said beam, and detection means responsive to the reflected component of said beam but substantially independent of the emitted component thereof.

5. In an apparatus for measuring radiation from a sample, in combination, a source of radiant energy in spaced relationship with said sample, means including a hemispherical mirror disposed about said source and said sample, said sample being located with respect to said mirror at the conjugate focus of the location of said source, whereby radiation from said source is directed by said mirror to said sample from a large solid angle and is reflected thereby, means for receiving a beam of radiation from a portion of said sample facing said mirror, said beam subtending a comparatively small solid angle from said sample and including a reflected component and a component emitted thereby, means for producing a periodic modulation in the reflected component of said beam, and detection means responsive to said beam for deriving therefrom a signal representative of said reflected component and substantially independent of said emitted component.

6. In an apparatus for measuring radiation from a sample, in combination, a source of electromagnetic radiation in spaced relationship with said sample, mirror means including a specularly reflective concave surface disposed adjacent said source and said sample, the configuration of said mirror means being such that it has conjugate foci, said sample being located at one of said foci and said source being located at the conjugate focus such that radiation from said source is directed by said surface to said sample from a large solid angle and is reflected thereby, means for receiving a beam of radiation from said sample, said beam including a reflected component and a component emitted by said sample, chopping means for periodically interrupting the radiation from said source prior to the time it reaches said sample, to similarly interrupt the reflected component of said beam, and detection means located at a position remote from said mirror means and responsive to the frequency of said periodic interruptions for deriving from said beam a signal representative of said reflected component and substantially independent of said emitted component.

7. In an apparatus of the character set forth in claim 6, in combination, additional chopping means for periodically interrupting said beam of radiation, to similarly interrupt both said reflected component and said emitted component, said detection means deriving from said beam an emission signal dependent upon said emitted component during operation of said additional chopping means.

8. In an apparatus of the character set forth in claim 6, in combination, additional chopping means for periodically interrupting said beam of radiation, to similarly interrupt both said reflected component and said emitted component, said first-mentioned chopping means and said additional chopping means preventing said reflected component from reaching said detection means, said detection means being responsive to the frequency of said additional chopping means for deriving from said beam a signal representative of said emitted component.

9. In an apparatus for measuring radiation from a sample, in combination, a source of radiant energy in spaced relationship with said sample, mirror means including a specularly reflective concave surface disposed adjacent said source and said sample, said mirror means having a configuration such that for a given placement of said source radiation from said source is directed by said surface to a focus from a large solid angle, said sample being located at said focus, means for receiving a first beam of radiation directly from said source, means for receiving a second beam of radiation from said sample, said second beam including a reflected component and a component emitted by said sample, means for producing a periodic modulation in the reflected component of said second beam, detection means, and means for directing said first and second beams of radiation to said detection means, said detection means deriving from said second beam a signal representative of said reflected component and substantially independent of said emitted component.

10. In an apparatus for measuring the reflectivity of a sample, in combination, a source of radiant energy in spaced relationship with said sample, means including a highly reflective hemispherical mirror disposed adjacent said source and said sample, said sample being located with respect to said mirror at the conjugate focus of the location of said source, whereby radiation from said source is directed by said mirror to said sample from a large solid angle and is reflected thereby, means for receiving a first beam of radiation from said source, means for receiving a second beam of radiation from said sample, said second beam including a reflected component and a component emitted by said sample, means for producing a periodic modulation in the reflected component of said second beam, detection means, and mirror means for directing said first beam and said second beam to said detection means, said detection means deriving from the periodic modulation in the reflected component of said second beam a signal representative of said reflected component and substantially independent of said emitted component, to enable the comparison of said first beam with the reflected component of said second beam.

11. In an apparatus for measuring the reflectivity of a sample, in combination, a light source positioned in spaced relationship with said sample, mirror means including a specularly reflective concave surface disposed adjacent said source and said sample, said mirror means having a configuration such that for a given placement of said source light from said source is directed by said surface to a focus from a large solid angle, said sample being located at said focus, means for receiving a reference beam of light directly from said source, means for receiving a second beam of light from said sample, said second beam subtending a comparatively small solid angle from said sample and including a reflected component and a component emitted thereby, means for periodically interrupting the light from said source prior to the time it reaches said sample, to similarly interrupt the reflected component of said second beam, detection means, and means for simultaneously directing said reference light beam and said second light beam to said detection means, said detection means deriving from said second beam a signal representative of said reflected component and substantially independent of said emitted component, to enable the comparison of said reference beam with the reflected component of said second beam.

12. In an apparatus for measuring diffffuse reflectivity, in combination, a light source and a sample in spaced-apart relationship with each other, said sample having a substantially flat reflecting surface, a hemispherical mirror disposed about said source and said sample, said sample surface being located with respect to said mirror at the conjugate focus of the location of said source, whereby light from said source is directed by said mirror to said surface from a large solid angle and is reflected thereby, first means for receiving a first beam of light directly from said source, second means for receiving a second beam of light from said sample surface from a direction normal thereto, said second beam including a diffusely reflected component and a component emitted by said sample, means for periodically interrupting the light from said source prior to the time it reaches said sample, to similarly interrupt the reflected component of said second beam, detection means located at a position remote from said hemispherical mirror, and mirror means for directing said first and second light beams from the respective first and second means to said detection means, said detection means deriving from said second beam a signal representative of said reflected component and substantially independent of said emitted component, to enable the comparison of said first beam with the reflected component of said second beam and thereby ascertain the diffuse reflectivity of said sample.

13. In an apparatus for measuring the reflectivity of a sample, in combination, a light source positioned in spaced relationship with said sample, mirror means including a specularly reflective concave surface disposed about said source and said sample for reflecting light from said source to said sample, said mirror means having a configuration such that for a given placement of said source light from said source is directed to a focus from a solid angle representative of the light from a hemispherical solid angle around said sample, said sample being located at said focus, means for receiving a first beam of light from a portion of said source remote from said concave surface, means for receiving a second beam of light from a portion of said sample facing said concave surface, said second beam including a reflected component and a component emitted by said sample, means for producing a periodic modulation in the reflected component of said second beam, means for receiving a third beam of light from a portion of said source facing said concave surface, detection means, and means for directing each of said light beams to said detection means, said detection means deriving a composite signal representative of said first and third light beams and a sample signal representative of the reflected component of said second light beam but substantially independent of said emitted component.

14. In an apparatus for measuring the reflectivity of a sample, in combination, a light source positioned in spaced relationship with said sample, means including a highly reflective hemispherical mirror disposed about said source and said sample and having at least one opening in the hemispherical surface thereof, said sample being located with respect to said mirror at the conjugate focus of the location of said source, whereby light from said source is directed by said mirror to said sample from a large solid angle and is reflected thereby, means for receiving a first beam of light directly from said source, said opening being arranged to receive a second beam of light from said sample, said second beam including a reflected component and a component emitted by said sample, means for producing a periodic modulation in the reflected component of said second beam, detection means spaced from said hemispherical mirror, and means for directing said first light beam and said second light beam to said detection means, said detection means deriving from said second beam a signal representative of said reflected component and substantially independent of said emitted component, to enable the comparison of said first beam with the reflected component of said second beam.

15. In an apparatus for measuring the reflectivity of a sample, in combination, a light source positioned in spaced relationship with said sample, means including a highly reflective hemispherical mirror disposed about said source and said sample and having at least one opening in the hemispherical surface thereof, said sample being located with respect to said mirror at the conjugate focus of the location of said source, whereby light from said source is directed by said mirror to said sample from a large solid angle and is reflected thereby, means for receiving a first beam of light directly from said source, said opening being arranged to receive a second beam of light from said sample, said second beam including a reflected component and a component emitted by said sample, means for periodically interrupting the light from said source prior to the time it reaches said sample, to similarly interrupt the reflected component of said second beam, detection means, and mirror means for simultaneously directing said first light beam and said second light beam to said detection means, said detection means deriving from said second beam a signal representative of said reflected component and substantially independent of said emitted component, to enable the comparison of said first beam with the reflected component of said second beam.

16. In an apparatus of the character set forth in claim 15, in combination, in which said first beam of light is received directly from a portion of said source remote from said hemispherical mirror, means for receiving a calibration beam of light directly from a portion of said source facing said mirror, said mirror means directing said calibration beam to said detection means.

17. In an apparatus for measuring the reflectivity of a sample, in combination, a light source positioned in spaced relationship with said sample, means including a highly reflective hemispherical mirror disposed about said source and said sample and having at least one opening in the hemispherical surface thereof, said sample being located with respect to said mirror at the conjugate focus of the location of said source, whereby light from said source is directed by said mirror to said sample from a large solid angle and is reflected thereby, means for receiving a first beam of light directly from said source, said opening being arranged to receive a second beam of light from said sample, said second beam including a reflected component and a component emitted by said sample, first chopping means for periodically interrupting said first beam, second chopping means for periodically interrupting the light from said source prior to the time it reaches said sample, to similarly interrupt the reflected component of said second beam, detection means, and mirror means for directing said first light beam and said second light beam to said detection means, said detection means deriving from said second beam a signal representative of said reflected component and substantially independent of said emitted component, to enable the comparison of said first beam with the reflected component of said second beam.

18. In reflectivity measuring apparatus, in combination, a light source and a sample in spaced-apart relationship with each other, mirror means including a specularly reflective concave surface disposed about said source and said sample, the configuration of said mirror means being such that it has conjugate foci, said sample being located at one of said foci and said source being located at the conjugate focus, whereby light from said source is directed by said surface to said sample and is reflected thereby, said mirror means illuminating said sample with light from said source from a solid angle representative of the light from a hemispherical solid angle around said sample, detection means, first means for directing a first beam of light from said source to said detection means, second means for directing a second beam of light from said sample to said detection means, said second beam including a reflected component and a component emitted by said sample, first chopping means for periodically interrupting said first beam at a frequency $f_1$, and second chopping means for periodically interrupting the light from said source at a frequency $f_2$ prior to the time it reaches said sample, to similarly interrupt the reflected component of said second beam, said detection means deriving from said second beam a signal representative of said reflected component and substantially independent of said emitted component, to enable the comparison of said first beam with the reflected component of said second beam.

19. In reflectivity measuring apparatus, in combination, a light source and a sample in spaced-apart relationship with each other, mirror means including a specularly reflective concave surface disposed adjacent said source and said sample, said surface subtending a large solid angle from said sample and having a configuration such that for a given placement of said source light therefrom is directed to a focus from said solid angle, said sample being located with respect to said surface at said focus, whereby light from said source is directed by said surface to said sample and is reflected thereby, detection means, first means for directing a first beam of light from said source to said detection means, second means for directing a second beam of light from said sample to said detection means, said second beam including a reflected component and a component emitted by said sample, first chopping means for periodically interrupting said first beam, second chopping means for periodically interrupting the light from said source prior to the time it reaches said sample, to similarly interrupt the reflected component of said second beam, and third chopping means for periodically interrupting both the reflected component and the emitted component of said second beam, said detection means deriving from said second beam a reflectivity signal representative of said reflected component and substantially independent of said emitted component and an emission signal representative of said emitted component.

20. In reflectivity measuring apparatus, in combination, a light source and a sample in spaced-apart relationship with each other, a hemispherical mirror including a highly reflective concave surface disposed about said source and said sample, said sample being located with respect to said surface at the conjugate focus of the location of said source, whereby light from said source is directed by said surface to said sample from a large solid angle and is reflected thereby, detection means spaced from said hemispherical mirror, first mirror means for directing a first beam of light from said source to said detection means, second mirror means for directing a second beam of light from said sample to said detection means, said second beam including a reflected component and a component emitted by said sample, first chopping means for periodically interrupting said first beam at a frequency $f_1$, second chopping means for periodically interrupting the light from said source at a frequency $f_2$ prior to the time it reaches said sample, to similarly interrupt the reflected component of said second beam, and third chopping means for periodically interrupting both the reflected component and the emitted component of said second beam at said frequency $f_2$, said detection means deriving from said first beam and said second beam a reflectivity signal representative of said reflected component and substantially independent of said emitted component and also deriving from said first beam and said second beam an emission signal representative of said emitted component.

21. Reflectivity measuring apparatus of the character set forth in claim 20, in which said frequency $f_1$ is twice said frequency $f_2$.

22. In reflectivity measuring apparatus, in combination, a light source and a sample in spaced-apart relationship with each other, a hemispherical mirror including a highly reflective concave surface disposed about said source and said sample, said sample being located with respect to said surface at the conjugate focus of the location of said source, whereby light from said source is directed by said surface to said sample from a large solid angle and is reflected thereby, detection means located at a position remote from said hemispherical mirror, first mirror means for directing a first beam of light from a portion of said source remote from said concave surface to said detection means, second mirror means for simultaneously directing a second beam of light from a portion of said sample facing said concave surface to said detection means, said second beam including a reflected component and a component emitted by said sample, third mirror means for directing a third beam of light from a portion of said source facing said concave surface to said detection means, and means including a continuously rotating chopper in juxtaposition with said source for periodically interrupting light therefrom prior to the time it reaches said ample, to similarly interrupt said third beam and the reflected component of said second beam, said detection means including means for deriving a composite signal representative of said first and third light beams and for thereafter deriving a sample signal representative of the reflected component of said second beam but substantially independent of said emitted component.

23. In reflectivity measuring apparatus, in combination, a light source and a sample in spaced-apart relationship with each other, a hemispherical mirror including a highly reflective concave surface disposed about said source and said sample, said sample being located with respect to said surface at the conjugate focus of the location of said source, whereby light from said source is directed by said mirror to said sample from a large solid angle and is reflected thereby, detection means located at a position remote from said hemispherical mirror, mirror means for directing a first, a second and a third light beam to said detection means, said first light beam being derived from a portion of said source remote from said concave surface, said second light beam being derived from a portion of said sample facing said concave surface and said third light beam being derived from a portion of said source facing said concave surface, said second beam including a reflected component and a component emitted by said sample, first chopping means for periodically interrupting said first beam at a frequency $f_1$, and second chopping means for periodically interrupting the light from said source at a frequency $f_2$ prior to the time it reaches said sample, to similarly interrupt the reflected component of said second beam, said detection means including means for deriving a composite signal representative of said first and third beams and for comparing said composite signal with a sample signal derived from said second beam and representative of the reflected component thereof but substantially independent of said emitted component.

24. In reflectivity measuring apparatus of the character set forth in claim 23, in combination, means for supporting said sample at said conjugate focus and for maintaining the same at a substantially constant temperature.

25. In a reflectivity measuring apparatus, in combination, a light source and a sample in spaced-apart relationship with each other, a hemispherical mirror including a highly reflective concave surface disposed about said source and said sample, said sample being located with respect to said surface at the conjugate focus of the location of said source, whereby light from said source is directed by said mirror to said sample from a large solid angle and is reflected thereby, detection means located at a position remote from said hemispherical mirror, mirror means for directing a first, a second and a third light beam to said detection means, said first light beam being derived from a portion of said source remote from said concave surface, said second light beam being derived from a portion of said sample facing said concave surface and said third light beam being derived from a portion of said source facing said concave surface, said second beam including a reflected component and a component emitted by said sample, first chopping means for periodically interrupting said first beam at a frequency $f_1$, second chopping means for periodically interrupting the light from said source at a frequency $f_2$ prior to the time it reaches said sample, to similarly interrupt said third beam and the reflected component of said second beam, and third chopping means for periodically interrupting both the reflected component and the emitted component of said second beam, said detection means including means for deriving a composite signal representative of said first and third beams and for comparing said composite signal with a sample signal derived from said second beam and representative of the reflected component thereof but substantially independent of said emitted component.

26. In an apparatus for measuring radiation from a sample, in combination, a source of radiant energy in spaced relationship with said sample, mirror means including a specularly reflective concave surface disposed adjacent said source and said sample, the configuration of said mirror means being such that it has conjugate foci, said sample being located at one of said foci and said source being located at the conjugate focus such that radiation from said source is directed by said surface to said sample from a large solid angle and is reflected thereby, means for receiving a first beam of radiation directly from said source, means for receiving a second beam of radiation from said sample, said second beam including a reflected component and a component emitted by said sample, and means for producing in the reflected component of said second beam a periodic modulation distinguishing it from said emitted component.

27. In reflectivity measuring apparatus, in combination, a light source and a sample in spaced-apart relationship with each other, mirror means including a specularly reflective concave surface disposed about said source and said sample, said mirror means having a configuration such that for a given placement of said source light from said source is directed by said surface to a focus, said sample being located at said focus, said mirror means illuminating said sample with light from said source from a solid angle representative of the light from a hemispherical solid angle around said sample, means for receiving a first beam of light from said source, means for receiving a second beam of light from said sample, said second beam including a reflected component and a component emitted by said sample, first chopping means for periodically interrupting said first beam, and second chopping means for periodically interrupting the light from said source prior to the time it reaches said sample, said second chopping means modulating said second beam to distinguish the same from said first beam.

28. In reflectivity measuring apparatus, in combination, a light source and a sample in spaced-apart relationship with each other, a hemispherical mirror including a highly reflective concave surface disposed about said source and said sample, said sample being located with respect to said surface at the conjugate focus of the location of said source, whereby light from said source is directed by said surface to said sample from a large solid angle and is reflected thereby, first mirror means for receiving a first beam of light from a portion of said source remote from said concave surface, second mirror means for simultaneously receiving a second beam of light from a portion of said sample facing said concave surface, said second beam including a reflected component and a component emitted by said sample, third mirror means for receiving a third beam of light from a portion of said source facing said concave surface, and means including a continuously rotating chopper in juxtaposition with said source for periodically interrupting light therefrom prior to the time it reaches said sample, to similarly interrupt said third beam and the reflected component of said second beam.

No references cited.

JEWELL H. PEDERSEN, *Primary Examiner.*

O. B. CHEW, *Assistant Examiner.*